Dec. 3, 1968     D. O. WESTRUM     3,413,675
HAND WIPER FOR AUTO BODIES
Filed Jan. 3, 1967
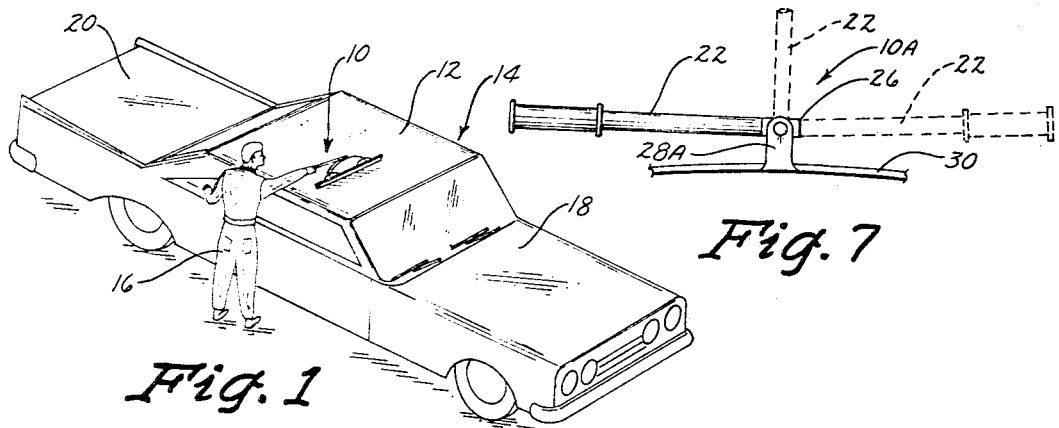
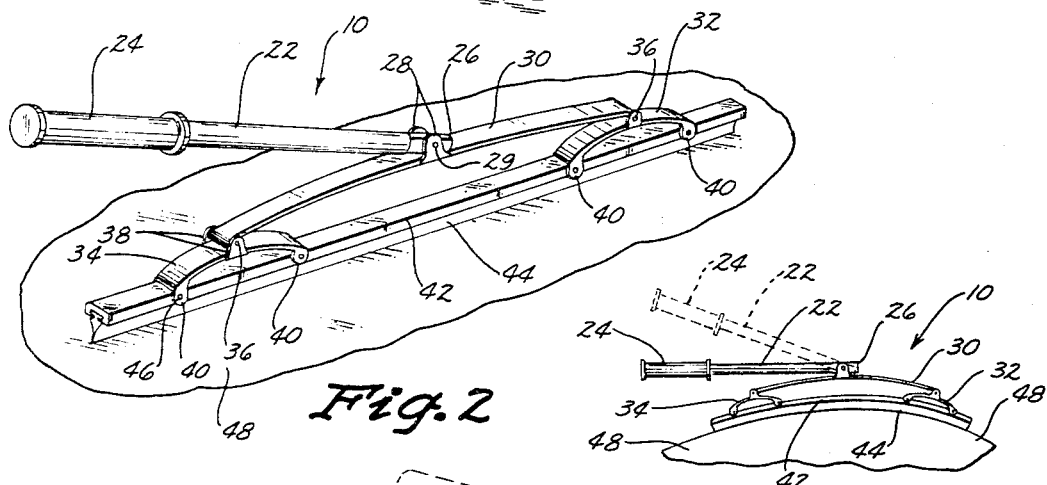
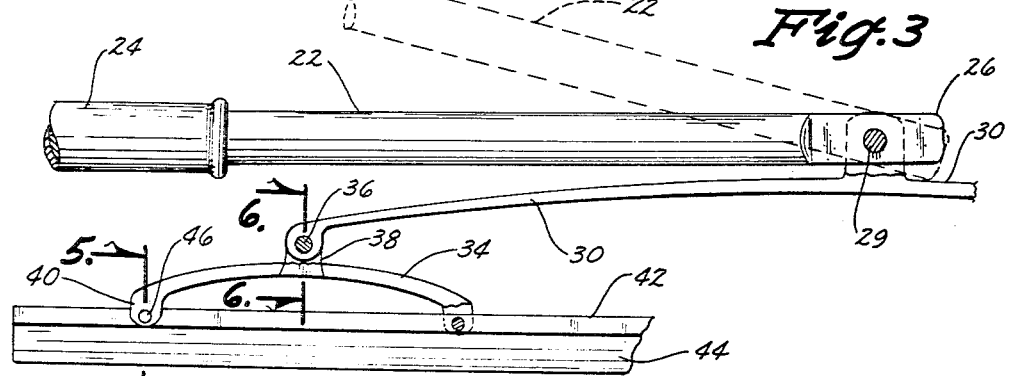
INVENTOR
DICK O. WESTRUM
BY
Dick, Zarley, McKee & Thomte
ATTORNEYS United States Patent Office 3,413,675
Patented Dec. 3, 1968

3,413,675
HAND WIPER FOR AUTO BODIES
Dick O. Westrum, Stratford, Iowa 50249
Filed Jan. 3, 1967, Ser. No. 607,028
1 Claim. (Cl. 15—245)

ABSTRACT OF THE DISCLOSURE

A hand operated wiper including elongated handle pivotally attached to elongated flexible frame member carrying a wiper or cleaning element adapted to flex sufficiently for matingly conforming to the exterior surface of an automobile body or the like.

---

The washing of an automobile includes the soaping and scrubbing step and then the rinsing step followed by the drying of the automobile. After the car has been rinsed a considerable quantity of water normally stands on the large flat areas of the car such as the roof, hood, trunk and fenders. A common practice is to use a chamois for removing this water which if left to dry will leave a spotted exterior finish. The use of a chamois requires considerable effort as the user must reach over the top of the car from a platform. The chamois need to be rung out frequently to remove the accumulated moisture. Moreover, the chamois are quite expensive.

This invention involves the use of a hand cleaning tool which will reduce the time required to dry an automobile to a fraction of that required using a chamois. This hand operated cleaning device may be moved along the length of the car over the trunk top and hood. The user need only walk along the side of the vehicle. Most of the water will be removed the first time over and if necessary the wiper may be moved back and forth until all of the water is gone. The wiper element is of such a length that it will extend approximately half the width of the car such that the person may walk along one side and then the opposite side to cover the entire top surface area. The handle on the body wiper device eliminates the need of reaching over the top of the car and is connected to the wiper in a manner that will permit accurate positioning of the wiper on the vehicle thereby for example eliminating undesirable turning of the wiper. The frame of the wiper and the wiper element are of flexible material such that they conform as required to the exterior shape of the surface being wiped. After this device has been used, no further drying is ordinarily necessary.

These and other features and advantages of this invention will become readily apparent to those skilled in the art upon reference to the following description when taken into consideration with the accompanying drawings, wherein:

FIG. 1 is a perspective view of an automobile and a person using the wiper device of this invention on the roof of an automobile to remove standing water;

FIG. 2 is an enlarged fragmentary perspective view of the wiper device with the cleaning element in mating engagement with the vehicle body exterior;

FIG. 3 is a reduced in scale side elevation view of the wiper device showing the wiper element in mating wiping engagement with an arcuate surface and also showing a handle in alternate positions;

FIG. 4 is an enlarged fragmentary view of the wiper device;

FIG. 5 is a cross sectional view taken along line 5—5 in FIG. 4;

FIG. 6 is a cross sectional view taken along line 6—6 in FIG. 4; and

FIG. 7 is a reduced in scale side elevation view of an alternate embodiment of this invention showing the handle member being pivoted to positions extending from opposite ends of the wiper element frame.

The hand wiper device of this invention is generally referred to in FIG. 1 by the reference numeral 10 and is shown in use on the roof 12 of an automobile 14. The person 16 holding the wiper device 10 may move along the side of the car and also wipe the hood 18 and the trunk top surface 20. The moisture on the sides of the cars will mostly run off but, if necessary, the wiper device 10 may also be used.

The wiper device 10 includes a handle member 22 having an outer handle portion 24 and a squared off inner end portion 26, positioned between a pair of ears 28. A pin 29 extends through aligned openings in the ears 28 and the inner end 26 of the handle member 22. The ears 28 are upstanding on a flexible frame member 30 slightly arcuate in shape and having at its outer ends similarly shaped but smaller in size arcuate frame portions 32 and 34 which are pivotally connected by pins 36 which extend through upstanding ears 38 and an aligned opening in the adjacent end of the frame member 30.

The outer ends of the end frame portions 32 and 34 are provided with downwardly extending flange portions 40 which embrace a channel shaped member 42 holding a rubber V-shaped in cross-section cleaner element 44. A pin 46 serves to interconnect the legs 40 to the channel member 42 and provide for the necessary flexing of the channel member 42 as the cleaning element 44 moves across an irregularly shaped surface 48. It is seen in FIG. 5 that the V-shaped rubber cleaning element 44 has a sharp cleaning edge 50 for providing continuous mating contact with the exterior surface of the vehicle and thereby permit wiping substantially dry the wet area.

In FIGS. 2, 3 and 4 it is seen that the inner end 26 of the handle 22 is of such a length that it engages the top surface of the frame member 30 and accordingly limits the pivotal movement to approximately 45 degrees as shown between the solid and dash line positions in FIGS 3 and 4.

An alternate embodiment of the hand wiper device is shown at 10A in FIG 7 and includes a pair of upstanding ears 28A which permit the end portion 26 of the handle 22 to move freely over the frame member 30 and thus permit the positioning of the handle 22 in any desired position throughout a 180 degree range of positions as seen between the solid line and dash line handle positions. For example, the hand wiper device 10A may be used for the vertical sides of the vehicle and thus the handle 22 would extend in its upright position as viewed in FIG. 7, perpendicular to the frame 30 whereas when the device is being used on the top surfaces of the vehicle 14 the handle 22 will extend generally parallel to the frame member 30.

It is thus seen that a very versatile, inexpensive and simple in construction device has been provided for effectively and efficiently wiping moisture from the exterior surfaces of an automobile or the like.

Some changes may be made in the construction and arrangement of my Hand Wiper for Auto Bodies without departing from the real spirit and purpose of my invention, and it is my intention to cover by my claim, any modified forms of structure or use of mechanical equivalents which may be reasonably included within their scope.

I claim:
1. A hand wiper for auto bodies, comprising:
   an elongated handle member having an outer free end adapted to be held by an operator,
   an elongated frame member parallel to said handle member and pivotally connected to the outer end thereof for pivotal movement about an axis extending transversely of the longitudinal axis of said handle member and frame member, and an elongated flexible cleaning element secured by means to said frame member and adapted to conform to the shape of rounded bodies,
said pivotal connection of said handle member to said frame member being at approximately the center of said frame member and said cleaning element,
said cleaning element being secured by said means at adjacent the outer ends of said frame member and adjacent the outer ends of said cleaning element,
said frame member being flexible along its length,
said securing means including a fastener element pivotally connected at each end of said frame member and extending in parallel relationship to said member, said fastener element having each of its opposite ends pivotally connected to said flexible cleaning element,
means is provided for limiting the pivotal movement of said handle about said transverse axis to an arc of less than 90 degrees,
said cleaning element is formed from rubber material and is V-shaped in cross-section thereby providing a sharp longitudinal cleaning edge, and
said frame including a pair of ears having aligned openings and said handle member has an opening through its inner end and is positioned between said pair of ears, and a pin extends through said opening in said ears and said handle.

References Cited
UNITED STATES PATENTS

| | | | |
|---|---|---|---|
| 1,827,121 | 10/1931 | Trane | 15—245 X |
| 2,772,435 | 12/1956 | Louk | 15—245 |
| 3,085,277 | 4/1963 | Bock et al. | 15—250.3 |
| 3,107,384 | 10/1963 | Wise | 15—250.4 |
| 3,176,337 | 4/1965 | Glynn | 15—250.4 |

PETER FELDMAN, *Primary Examiner.*